United States Patent [19]

Genest

[11] 4,029,050

[45] June 14, 1977

[54] FISH HANDLING APPARATUS

[76] Inventor: Earl Wilfred Genest, 5716 Geyser Ave., Tarzana, Calif. 91356

[22] Filed: Apr. 27, 1976

[21] Appl. No.: 680,718

[52] U.S. Cl. ............................................... 119/5
[51] Int. Cl.$^2$ ...................................... A01K 63/02
[58] Field of Search ........................ 119/5, 3, 2, 4

[56] References Cited

UNITED STATES PATENTS

| | | | |
|---|---|---|---|
| 3,044,209 | 7/1962 | Roach | 119/5 X |
| 3,288,110 | 11/1966 | Goldman et al. | 119/5 |
| 3,304,912 | 2/1967 | Hackman et al. | 119/5 |

Primary Examiner—J.N. Eskovitz
Attorney, Agent, or Firm—Georges A. Maxwell

[57] ABSTRACT

Apparatus for segregating, collecting and removing fish from aquarium tanks comprising a divider engageable in a tank to divide said tank into compartments, a window opening in the divider through which fish can be herded from one compartment to another and a closure panel removably engageable in overlying relationship with the window opening, an upwardly opening box-like receiver engageable in the tank and having a gateway in one side through which fish can be herded, a gate removably engageable in the gateway, means to releasably couple the divider and receiver with the window opening and gateway in register, the divider and the upper portion of the receiver being perforated to permit the free flow of water through and into and out of the divider and the viewer, the lower portion of the receiver being imperforate and defining a catch basin to retain a portion of tank water and fish when the receiver is removed from the tank.

10 Claims, 17 Drawing Figures

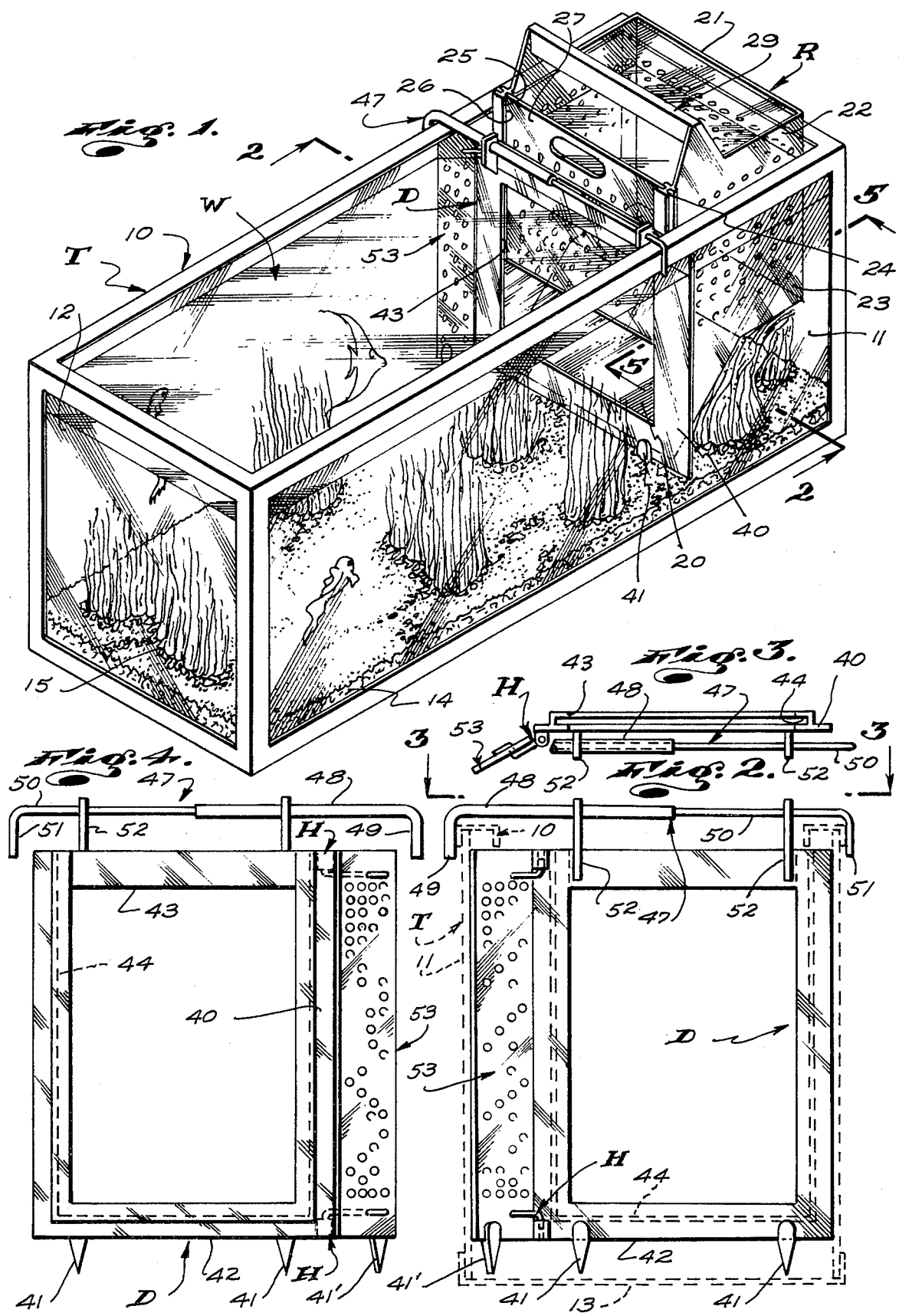

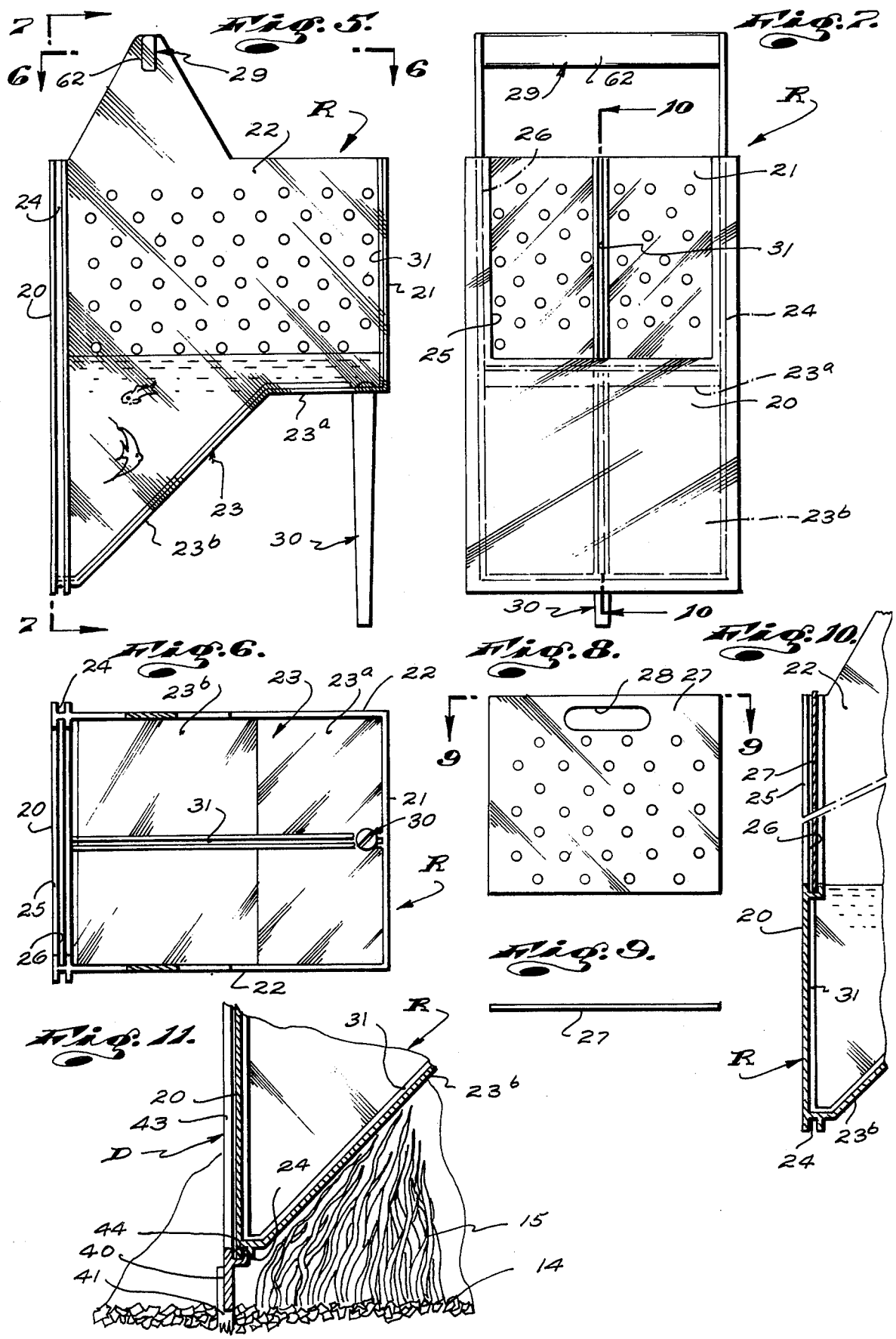

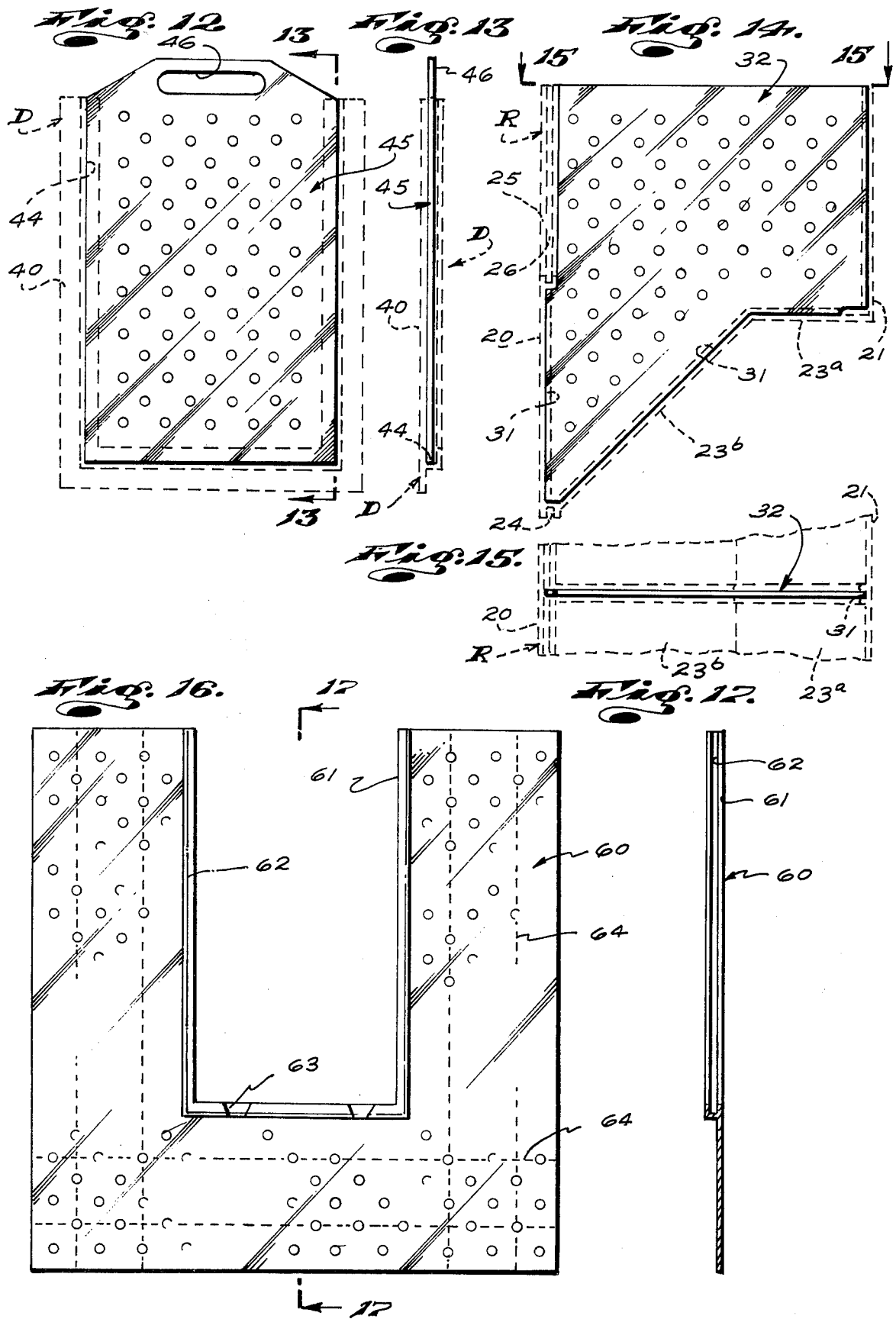

FISH HANDLING APPARATUS

This invention has to do with aquarium equipment and is more particularly concerned with novel apparatus for handling fish in and about aquariums.

In recent years, the keeping, studying and propagation of fish in confined tanks or aquariums has become a popular hobby or avocation and has created a rapidly growing industry engaged in the production, distribution and sale of many and varied products intended to aid and facilitate fishmen in pursuit of their hobbies.

In the course of keeping and maintaining fish in aquariums, it is necessary, from time to time, to remove the fish from the tanks for the purpose of cleaning the tanks, changing water in the tanks, the rearranging and/or cleaning of plants, gravel and other items which are commonly deposited in such tanks to enhance the environment for fish within the tanks and to enhance the aesthetics of the environment.

In the case of those fishmen engaged in pisciculture or the propagation of fish, it is necessary that fish in aquarium tanks be segregated to prevent cannibalism and the like. Such segregation of fish is also required when fish are injured or sick.

To this date, when it is desired or necessary to segregate and/or remove fish from aquarium tanks, it is common practice for fishmen to employ long-handled dip or scoop nets, which nets are plunged into the tanks from above and are manually moved about to chase down and catch or net the fish. The netted fish are then extracted from the tank and deposited into another tank or a waiting holding tank or bowl of water. The prior art is replete with various sizes and shapes of dip nets for the above purpose, but to the best of my knowledge and belief, the art has failed to provide any other safe and effective means for removing fish from tanks.

One exception to the above consists of a syringe-like unit which is operable to suck a selected fish into a receiving chamber with a volume of water. While such means will often work satisfactorily, it is not infrequent that a fish is seriously damaged or injured by the action of such means. Further, the use of such syringe-type fish catchers is generally quite slow and time consuming.

The above noted practice of netting and transporting or handling fish is extremely hazardous since the bringing of netting structures into contact with small, delicate and fragile fish inevitably results in some degree of damage or injury to the fish. Such damage or injury is not infrequently extensive and of such a nature that the fish are killed or must be destroyed.

Another serious shortcoming found in the handling of fish in accordance with present day practices resides in the fact that most fish are extremely sensitive to temperature changes and are made sick or are killed when they are removed from their tank and accustomed temperature environment and plunged into warmer or colder water in a waiting holding tank or the like.

Other shortcomings in transferring and handling fish in accordance with present day practices, utilizing dip nets and the like, resides in the fact that chasing fish about a tank to net them tires and frightens the fish, is a slow and time-consuming process and inevitably results in disturbing the tank, that is, displacing plants, gravel, statuary and the like, within the tank, and unsettling sediments so as to render the waters turbid.

The foregoing noted shortcomings are not all inclusive of those shortcomings to be found in handling fish in accordance with common practices but are only indicative of the nature of many shortcomings which exist.

In summation, it can be stated that it is undesirable to handle and transfer aquarium fish and/or disturb the established environment of an aquarium in any manner and that when such handling and transferring of fish is required, it is necessary that the fish and the environment of the tank in which the fish are held be disturbed as little as is possible.

An object and feature of my invention is to provide novel apparatus for the handling and transferring of fish in aquarium tanks, which apparatus is such that it results in little or a negligible amount of disturbance to the fish and/or to the environment within the tank from which the fish are removed or into which they are deposited.

It is an object and feature of my invention to provide a fish receiver unit which is such that it can be easily and effectively inserted into the water in an aquarium tank for receiving fish which are in that tank; a receiver unit which can be effectively disposed within the tank without materially adversely affecting or disturbing plants, gravel, statuary and the like within the tank; a unit into which fish can be easily and effectively herded without physical contact and with little or no disturbance to the fish; a unit which affords substantially free circulation of tank water into and out of its confines and a unit which establishes a tank water and fish holding sump, whereby that water and fish can be carried and transported with the unit, from within the tank, and held or kept in the tank water in the unit's sump for a desired period of time, without physically contacting the fish or removing them from water and subjecting them to undesirable temperature changes and resulting shock.

It is another object and feature of my invention to provide an apparatus which includes a tank divider engageable in an aquarium tank to define two compartments within the tank and with which my receiver unit can be cooperatively engaged to receive fish which are contained in one compartment of the tank.

An object and feature of my invention is to provide a divider of the character referred to above including window and closure panel means, whereby the passage of fish through the divider structure and from compartment in the tank to the other can be effectively controlled and through which water in the tank can effectively circulate.

Yet another object and feature of my invention is to provide an apparatus of the character referred to above wherein the receiver unit has a gateway or access opening in a side thereof, through which fish can move into and out of the confines of the receiver and a gate shiftable into and out of closing engagement in the opening to control the movement of fish into and out of the receiver.

An object and feature of this invention is to provide an apparatus of the character referred to wherein the divider has a window through which fish can move from one compartment or end portion of the tank to the other compartment or end portion of the tank and a closure panel shiftable into and out of engagement in the window to control such movement through the divider.

It is another object and feature of my invention to provide a partition means for the receiver to divide the receiver into compartments for receiving and segregating fish and such that the receiver can be left in a aquarium tank to maintain fish within the tank and within the compartments of the receiver in the tank in segregated condition, as desired, or as circumstances require.

Still another object and feature of this invention is to provide an apparatus of the character referred to above, including means for adjusting or altering the effective lateral and/or vertical dimensions of the divider, whereby the divider can be fitted and cooperatively related with tanks of varying or different vertical and lateral dimensions.

Finally, it is an object and feature of my invention to provide an apparatus of the character referred to wherein the several units or parts are established of transparent material and are such that when the apparatus is submerged in water it is not readily visible to fish in the water and does not disturb the fish by its presence.

The foregoing and other objects and features of my invention will be apparent and will be fully understood from the following detailed description of one typical preferred form and carrying out of my invention, throughout which description reference is made to the accompanying drawings in which:

FIG. 1 is an isometric view of an aquarium tank with my new apparatus related thereto;

FIG. 2 is a view showing the front side of my divider and taken substantially as indicated by line 2—2 on FIG. 1;

FIG. 3 is a view taken as indicated by line 3—3 on FIG. 2;

FIG. 4 is a rear view of my divider;

FIG. 5 is a side view of my new receiver unit and is taken substantially as indicated by line 5—5 on FIG. 1;

FIG. 6 is a view taken as indicated by line 6—6 on FIG. 5;

FIG. 7 is a view taken as indicated by line 7—7 on FIG. 5;

FIG. 8 is a front view of my receiver gate;

FIG. 9 is a view taken as indicated by line 9—9 on FIG. 8;

FIG. 10 is a view taken as indicated by line 10—10 on FIG. 7;

FIG. 11 is a sectional view of portions of the receiver unit and divider in inter-engaged relationship;

FIG. 12 is a front view of the divider panel that I provide;

FIG. 13 is a view taken as indicated by line 13—13 on FIG. 12;

FIG. 14 is a view showing a partition for my receiver unit;

FIG. 15 is a view taken as indicated by line 15—15 on FIG. 14;

FIG. 16 is a view of an adapter for my divider; and

FIG. 17 is a view taken as indicated by line 17—17 on FIG. 16.

The apparatus that I provide is adapted to be related to and used in conjunction with a typical or common form of aquarium tank such as is generally illustrated in FIG. 1 of the drawings. The tank T that I have shown is an elongate upwardly opening rectangular box-like tank comprising a frame 10 established or angle iron or the like, glass side and end panels 11 and 12 carried by the frame 10 and a bottom panel 13. The top horizontal flanges of the frame 10 project laterally inwardly about the open top of the tank and restrict the opening of the tank to a limited extent. The tank T is substantially filled with and carries a supply or body of water W, the top level or surface of which is spaced a limited distance below the top of the tank, substantially as shown in FIG. 1 of the drawings.

In practice, a layer or bed 14 of gravel and/or sand is deposited in the tank on and across the bottom 13 thereof and suitable marine plants 15, to establish a desirable environment for the fish, are planted in the bed or are otherwise anchored at the bottom of the tank adjacent to the bed. Other objects, such as simulated treasure chests, shipwrecks and similar statuary are frequently set on the bed 14 amongst the plants 15.

In practice, tanks of the general character referred to above are provided in many different sizes, ranging from 5 gallon capacity to 100 or 200 gallon capacity. The most common and popular sizes of commerically available tanks range from 10 gallon capacity to 50 gallon capacity.

The basic part of my apparatus which will first be described is a receiver unit R. The receiver unit is clearly illustrated in FIGS. 1 and 5 through 10 of the drawings.

The receiver unit R is a substantially square or cubic, upwardly opening box-like unit with flat, vertical front, rear and side walls 20, 21 and 22 and a bottom wall 23. The bottom wall 23 has a flat, horizontal rear portion $23^A$ and a flat, forwardly and downwardly inclined front portion $23^B$. The lower front edge of the portion $23^B$ substantially converges with the lower edge of the front wall 20. In practice, the lower front edge portion of the portion $23^B$ of the bottom wall 23 is horizontally disposed so as to prevent the establishment of a corner of acute angle across the interior bottom of the unit and in which fish might be crowded, caught and made inaccessible.

The front wall 20 of the receiver R is provided with a laterally, outwardly and downwardly opening mounting channel 24 about and preferably coextensive with its vertical side and horizontal bottom edges. The channel 24 can be said to open laterally outwardly and downwardly and to be positioned and/or arranged about the forward portion of the side and bottom walls of the receiver unit since the channel is established at and by structure at the junctions of the side and bottom walls with said front wall.

The front wall 20 of the receiver R is provided with a longitudinally and upwardly opening gateway 25 of limited vertical extent in its upper portion. The gateway 25 has vertical sides and a horizontal bottom, which sides and bottom are formed with a laterally inwardly and upwardly opening groove 26 adapted to cooperatively and slidably receive a flat, vertical rectangular closure plate or gate 27. The gate 27 can be provided with a finger engaging opening 28 in its upper portion and is shiftable vertically into and out of closed engagement in the gateway, as desired, or as circumstances require.

The receiver unit next includes a horizontal transversely extending manually engageable handle 29, above the open top of the tank to facilitate handling and transporting the unit. The handle 29 can be a simple bail-like handle or can, as shown, be a simple bar-like member 62 and extending between vertical extensions of the side walls of the unit.

The receiver next includes support means 30 at its rear end to support and hold the rear end of the unit up when its lower front edge is engaged with and supported by the related supporting structure or surface. The means 30 can, as shown, comprise a simple, elongate vertical leg fixed to the bottom wall 23 adjacent the rear wall of the unit and depending therefrom to terminate at a lower support engaging end on or at a predetermined horizontal plane below the rear end of the unit and which is in predetermined relationship to the plane on which the lower, transverse, front edge of the unit occurs.

The upper portion of the rear and side walls 21 and 22 of the unit and the closure plate or gate 27 are perforated to permit the free flow of water therethrough and into and out of the receiver unit, while the lower portions of the front, rear and side walls, below the plane of the lower edge of the gateway and the bottom wall of the unit, are imperforate so as to establish a sump or catch basin, as clearly shown in the drawings.

In accordance with the above, the receiver unit R comprises an upwardly opening box-like unit with a lower portion defining a catch basin, an upper screening portion, and a gateway with a movable closure to provide free access into the interior of the upper portion of the unit, as its front side. Further, the bottom and/or lower portion of the unit is substantially upwardly and rearwardly inclined so as to relieve the lower rear portion of the unit and to establish a transversely extending lower front edge, defined by related downwardly converging portions of the front and bottom walls of the unit.

The relieved lower rear portion of the unit and the narrow lower front edge portion thereof establishes a novel and highly significant relationship of parts. The noted lower front edge portion of the unit is such that when the unit is engaged and/or lowered into the tank T, it operates to displace plants 15 in its path and establishes contact with the bed 14 in the tank along one narrow transverse line. The rear relieved portion of the unit, rearward of the lower forward edge portion thereof, effectively accommodates plants and the like, as well as fish, which occur below the unit and which would otherwise prevent or limit engagement of the unit in the tank or which would be disturbed and/or damaged by the unit when the unit is lowered in the tank.

In practice, the receiver R can be put to use by itself or can be used in combination with a divider structure which will hereinafter be described. When used by itself, the gateway of the unit is opened and the unit is submerged in the tank to rest on the bottom thereof. The top of the unit must occur above the surface of the water and the major extent of the gateway should be below the surface of the water.

When the unit is thus engaged in the tank T, all or selected fish in the tank are herded through the gateway into the interior of the receiver. When the fish are herded into the receiver, the gate 27 is lowered to close the gateway and to thereby trap the fish in the receiver.

When the fish are thus trapped in the receiver, the receiver can be manually lifted from engagement in the tank. As the receiver is lifted from within the tank, the water in the upper perforated or screen portion of the tank rapidly drains outward through the perforations and back into the tank. The fish in the tank drop or are lowered into the lower sump or catch basin established in the unit, as the water level in the unit drops and are left and retained in the small but adequate volume of tank water which remains in the catch basin.

With the excess water drained from the unit, as noted above, and with the fish retained in the water in the catch basin defined by the unit, the unit can be effectively set aside while servicing and cleaning the tank; can be transported to another tank in which the fishman wishes to deposit the fish, or the like.

When it is desired to discharge the fish from the receiver R, the above procedure is simply reversed.

In practice, when it is desired to simply segregate certain fish in the tank, but not remove them from the tank, the unit R can be engaged in the tank in the manner noted above. The fish to be segregated are then herded into the receiver and the gate is closed. The receiver, with the segregated fish, is then left in the tank until that time when the segregated fish can be freed, whereupon the gate is simply opened, the fish are herded out of the receiver and the receiver is removed from the tank. When the receiver R is used to segregate fish, as noted above, the upper screen portion of the receiver affords circulation of water into and out of the receiver which is adequate for the well-being of the fish within the receiver.

In practice, the receiver R is made of highly polished transparent plastic and is such that when it is submerged in the water in a related tank, the extensive flat surfaces or planes thereof are substantially invisible and the unit is such that it does not tend to frighten and disturb fish in the tank.

In practice, the receiver R is made small enough to be readily received in the smaller size of standard aquarium tanks.

In addition to the foregoing, the receiver R can be provided with retaining grooves or channels 31 to cooperatively receive and support a perforated partition 32 (see FIGS. 14 and 15 of the drawings). The channel 31 can, as shown, be defined by spaced parallel beads formed on the inside surfaces of the front, bottom and rear walls of the unit on the central vertical plane of the unit.

With partitioning means such as noted above, it will be apparent that fish within the receiver can be effectively segregated as desired or as circumstances require.

The apparatus that I provide next includes a divider D. The divider D is a substantially flat vertical plate-like structure adapted to be engaged in the tank T in desired spaced relationship between the ends thereof and to extend transverse the interior of the tank from one side panel 11 thereof to the other and from the top of the bed 14 in the tank to above the surface of the water 11 therein, as clearly shown in FIGS. 1 and 2 of the drawings.

In practice, the divider D includes a flat panel like body 40, the outside dimensions of which can be made to substantially correspond with the interior transverse cross-section of the tank T and such that when it is positioned in the tank, it effectively divides the tank into two compartments.

So as to retain the divider in position in the tank and prevent its displacement, I provide the body 40 with a pair of laterally spaced stakes 41 which depend from the lower bed engaging transverse edge 42 of the body and which penetrate the bed 14 when the body is positioned in the tank. The stakes 41 can be such that they penetrate the bed 14 and stop on the bottom panel 13 of the tank to prevent burying the lower edge portion of the body in the bed 14.

The body 40 is provided with a square or rectangular window opening 43 of substantial extent and establishing communication between the tank compartments defined by the body and through which fish can be easily herded.

The body 14 has front and rear surfaces corresponding to the front and rear of the above described receiver R. The rear surface of the body is provided with a substantially U-shaped, laterally inwardly and upwardly opening groove or guideway 44 about the vertical side and bottom edges of the window opening 43 and in which a flat, vertical, perforated rectangular panel 45 (see FIGS. 12 and 13) is slidably engaged to selectively open and close the window opening 43 and which is also adapted to selectively slidably interengage with the groove 24 of the receiver R, when desired, and as shown in FIGS. 1 and 11 of the drawings.

The panel 45 is coextensive with the window opening and is provided with a finger engaging opening or with an upwardly projecting handle structure 46 at its upper end to facilitate manual engagement and operation of the panel.

In addition to the above, the divider D is preferably provided with and includes hanger means 47 to engage the upper rim portion of the tank T, adjacent the divider, and to hold the divider up and in proper position in the tank. The hanger means 47 can vary widely in form and construction and is shown as including an elongate horizontal tube 48 with a downwardly turned frame engaging leg 49 at one, outer or free end and an elongate horizontal rod 50 slidably or telescopically engaged in the tube 48 and having a downwardly turned frame engaging leg 51 at its outer or free end. The tube and rod assembly is slidably engaged and supported by a pair of laterally spaced forwardly and upwardly projecting ears 52 on the upper edge portion of the body 40 to extend transverse the tank in spaced relationship above the top of the tank and with the legs 49 and 50 thereof in bearing engagement with the opposite exterior sides of the tank structure, as shown in FIGS. 1 and 2 of the drawings.

The means 47 is laterally adjustable and such that the legs 49 and 51 can be manually moved or adjusted to snugly engage the exterior of the tank and thereby firmly secure the upper portion of the body in position within the tank.

In practice, and as shown in the drawings, the divider D is provided with a flat, perforated vertical, adjusting wing 53 related to one vertical side edge of the body and adapted to be pivoted relative to the body and thereby adjust the divider to effectively and properly fit the interior of tanks of different or varying lateral extent.

The wing 53 is a simple, elongate, vertical rectangular panel and is releasably hingedly secured to its adjacent vertical side edge of the body 40 by suitable hinge means H.

The lower edge of the wing 53 can be provided with a bed engaging stake 41' similar to the stakes 41 on the body 40. It will be apparent that with the wing 53 that I provide, the effective lateral extent of the divider D can be easily and effectively adjusted, as desired, or as circumstances require.

In addition to affording for a lateral adjustment of the divider D, within the tank T, the wing 53 can also be of great assistance in effecting insertion and removal of the divider D in a tank having an open top which is materially restricted in lateral extent by the inwardly projecting top flange portion of the frame structure 10 of the tank.

In those cases or instances where the divider D is to be related to a tank which is larger in transverse cross-section than the body 40, or larger than the body and wing assembly, I provide a flat vertical perforated adapter plate 60 (see FIGS. 16 and 17 of the drawings) which is provided with an upwardly and axially opening rectangular recess 61 with a laterally, inwardly and upwardly opening channel 62, coextensive with its horizontal and vertical edges and in which related vertical side and horizontal bottom edges of the divider body are or can be slidably engaged. One side of the channel, along the bottom edge of the recess, is relieved at laterally spaced locations, as shown at 63, to accommodate the stakes 41 on the body. The perforated adapter plate 60 is substantially larger than is required and such that it can be effectively cut and/or trimmed to fit any desired tank. The plate is made of thin, transparent plastic stock which can be effectively cut with common household shears and is preferably provided printed or scored lines 64 in spaced parallel relationship with its outside edges to facilitate cutting and trimming the plate to correspond with and to fit the interior of a tank with which the structure is to be related.

With the plate 60 here provided, it will be apparent that the plate can be cut to fit a tank and that the divider body can be slidably engaged in and with the plate to establish a divider assembly or unit which can be effectively engaged in a tank which the plate 60 has been cut and trimmed to fit and to thereby effectively divide the tank into two compartments, that is, a front and rear compartment.

The divider structure is established of highly polished transparent plastic material and is such that it is substantially invisible to fish when in the water W in the tank T.

In use, the divider structure, whether comprising a body 40 alone, the body 40 and wing 53, or the body 40 and adapter plate 60, can be arranged in the tank T at any suitable and desired location longitudinally of the tank to effectively divide or compartmentalize the tank. With the divider structure thus positioned, the panel 45 is elevated and/or removed to open the window 43 and to thereby permit free herding and movement of the fish through the divider and from one compartment to the other. When the fish are herded and segregated in the compartments in the tank, as desired, the panel 45 is lowered to close the window. The perforations in the panel 45 and in the wing 53 or adapter plate 60, if either is used, provides adequate circulation of water through the divider to maintain desired water conditions in and throughout the tank.

In practice, the divider structure can be used to segregate fish in the tank for some desired or necessary reason and for a protracted period of time. In the preferred use of my apparatus, the divider D and receiver R are used together or in conjunction with each other. The divider D is used in the manner set forth above to first herd and trap fish in the front compartment of the tank. When the fish are thus herded and trapped, the receiver is cooperatively related with the divider by slidably engaging the channel 24 of the receiver in and with the groove 44 about the window 43 in the divider, whereby the front of the receiver overlies the rear of the window in the divider. When the receiver R is thus engaged and carried by the divider, the panel 45 of the divider is raised and/or removed to open the window 43 and the gate 27 of the receiver is elevated to open the gateway 26. With the window and gateway thus opened, the fish in the front compartment of the tank can be freely and easily herded through the window and gateway into the receiver R. When the fish are in the receiver, the gate is lowered and the receiver R, with the fish therein, is ready to be removed and can be elevated out of engagement with the divider and from within the tank T for whatever purpose the fishman desires.

After the receiver is removed, the divider D can be removed or can, if desired, be left in the tank for subsequent use and/or re-engagement of the receiver R therewith, as for the purpose of redelivering the fish into the tank.

It will be apparent that with the apparatus here provided, fish can be safely herded, segregated, transported and otherwise handled without subjecting them to physical and potentially harmful contact with nets and the like. Further, it will be apparent that with the apparatus that I provide, the fish need never be removed from water and that the time required to effect desired handling and/or transfer of fish can be materially reduced. Still further, with my new apparatus, the handling of fish can be effected with little or no disturbance to the environment within the tank.

In practice, with the apparatus that I provide, two dozen fish in a hundred gallon tank can be effectively herded into the receiver and safely removed from the tank in less than 5 minutes without disturbing or damaging the fish or the environment of the tank. Removing the same number of fish from the same tank by means of a dip net, in accordance with common practice, frequently takes more than 30 minutes and inevitably results in substantial disturbance and damage to the fish and the environment in the tank.

The apparatus disclosed in the drawings and described in the foregoing is substantially the same as certain prototypes of my apparatus that I have built and successively put into practice. It is recognized, however, and it is to be clearly understood that in practice, the details of construction of my apparatus are subject to and can be varied considerably without adversely affecting or departing from the spirit of my invention.

For example, both the details of construction and the configuration of certain parts and/or portions of the structure here provided must necessarily depend upon the technology employed in manufacturing the apparatus. If, for example, the elements and parts of the structure are molded of plastic in accordance with good practices, the configuration and structural details of the parts going to make up the apparatus will necessarily differ substantially from details of construction and configuration of equivalent parts fabricated of cut and fastened sheet stock and the like.

Having described only one typical preferred form and embodiment of my invention, I do not wish to be limited to the specific details herein set forth, but wish to reserve to myself any modifications and/or variations that may appear to those skilled in the art and which fall within the scope of the following claims.

Having described my invention, I claim:

1. An apparatus for collecting, segregating and removing fish in aquarium tanks comprising an upwardly opening box-like receiver with flat vertical front, rear and side walls and a bottom wall with a substantially horizontal rear portion and a forwardly and downwardly inclined front portion cooperating to define a fish and plant accommodating recess below the lower rear portion of the receiver, said front portion converging with the front wall and defining a narrow transverse lower tank bottom opposing forward edge, the portion of the side and rear walls occuring above a horizontal plane located a limited predetermined distance above the plane of the rear portion of the bottom wall being perforated, a gateway in the upper portion of the front wall above said horizontal plane, a laterally inwardly and upwardly opening channel about the gateway and a flat vertical perforated gate slidably engaged in the channel and shiftable vertically into and out of closed engagement with the gateway, said receiver being engageable in water in an aquarium tank with its top above the surface of the water in the tank and with its gateway extending below the surface of the water in the tank whereby fish in the tank can be herded through the gateway and into the receiver when the gateway is open and are retained in the receiver when the gateway is closed, the perforated gate and portions of the side and rear walls permitting free circulation of water into and out of the receiver above said horizontal plane therefrom, the portion of the receiver below said horizontal plane defining a sump to retain a predetermined volume of tank water and fish when the receiver is removed from the tank.

2. The receiver apparatus set forth in claim 1 including a manually engageable handle structure projecting upwardly therefrom and support means depending from the rear portion of the carrier to support the relieved rear portion of the receiver when the lower forward edge is engaged with a support structure.

3. The apparatus set forth in claim 1 which further includes a flat, vertical divider with front and rear surfaces and having side edges to occur adjacent opposite adjacent sides of a tank, a bottom edge to occur adjacent the bottom of a tank and an upper edge portion to project above the surface of the water in the tank, a window in the divider substantially corresponding in configuration with the front of the receiver, a laterally and upwardly opening groove at the rear of the divider and about the window, a perforated closure plate slidable in the groove and shiftable vertically into and out of closed engagement with the window, said receiver having a flange about its front end slidably engageable in said groove whereby said receiver is engageable with the divider with its front overlying the window.

4. The apparatus set forth in claim 3 and including laterally spaced stakes on and depending from the divider to engage in a sand and gravel bed on the bottom of a fish tank.

5. The apparatus set forth in claim 3 including hanger means on the divider to extend transverse the top of a related fish tank and having depending parts to engage opposite sides of the tank and supporting the divider in the tank.

6. The apparatus set forth in claim 3 including hanger means on the divider to extend transverse the top of a related fish tank and having depending parts to engage opposite sides of the tank and supporting the divider in the tank and including spaced stakes on and depending from the divider to engage in a sand and gravel bed on the bottom of a fish tank.

7. The apparatus set forth in claim 3 which further includes a flat vertical perforated extension wing and hinge means pivotally securing an edge of the wing adjacent one side of the divider, said wing being pivoted to engage the side of a related tank which is spaced from said one side of the divider.

8. The apparatus set forth in claim 7 including hanger means on the divider to extend transverse the top of a related fish tank and having depending parts to engage opposite sides of the tank and supporting the divider in the tank and including spaced stakes on and depending from the divider to engage in a sand and gravel bed on the bottom of a fish tank.

9. The apparatus set forth in claim 3 and further including a flat vertical perforated adapter plate with front and rear surfaces and with side and bottom edges cut to fix the interior of a related tank, an upwardly opening recess substantially corresponding with the outside configuration of the divider and a groove about the recess slidably receiving related edges of and supporting the divider.

10. The apparatus set forth in claim 1 including an inwardly opening channel on the longitudinal central vertical plane of the receiver about the front rear and bottom walls thereof and a flat vertical perforated partition corresponding in configuration with the interior cross-section of the receiver on said central vertical plane and slidably engaged with said inwardly opening channel and within the receiver to divide the interior of the receiver into compartments in which fish can be segregated.

* * * * *